(12) United States Patent
Poosapalli et al.

(10) Patent No.: US 12,086,436 B2
(45) Date of Patent: Sep. 10, 2024

(54) OPTION READ-ONLY MEMORY FIRMWARE-BASED REMEDIATION (71) Applicant: DELL PRODUCTS L.P., Round Rock, TX (US)

(72) Inventors: Karunakar Poosapalli, Bangalore (IN); Shekar Babu Suryanarayana, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 12 days.

(21) Appl. No.: 17/866,247

(22) Filed: Jul. 15, 2022

(65) Prior Publication Data
US 2024/0020032 A1 Jan. 18, 2024

(51) Int. Cl.
G06F 3/06 (2006.01)
G06F 13/42 (2006.01)

(52) U.S. Cl.
CPC ............ *G06F 3/0631* (2013.01); *G06F 3/061* (2013.01); *G06F 3/0679* (2013.01); *G06F 13/4282* (2013.01)

(58) Field of Classification Search
CPC ...... G06F 3/061; G06F 3/0631; G06F 3/0679; G06F 13/4282
See application file for complete search history.

(56) References Cited

U.S. PATENT DOCUMENTS

| 7,519,804 | B2 | 4/2009 | Liu | |
|---|---|---|---|---|
| 10,936,301 | B2 | 3/2021 | Suryanarayana et al. | |
| 2004/0139294 | A1* | 7/2004 | Colvig | G06F 11/1464 711/156 |
| 2007/0088943 | A1* | 4/2007 | Phelps | G06F 9/4401 713/2 |
| 2012/0324246 | A1* | 12/2012 | Rahardjo | G06F 1/26 713/300 |
| 2013/0111457 | A1* | 5/2013 | Culter | G06F 8/65 717/171 |
| 2013/0311761 | A1* | 11/2013 | Dasari | G06F 9/4411 713/1 |
| 2014/0297917 | A1* | 10/2014 | Shah | G06F 12/0638 711/102 |
| 2016/0378970 | A1* | 12/2016 | Campbell | G06F 21/575 726/17 |
| 2018/0314441 | A1* | 11/2018 | Suryanarayana | G06F 3/0683 |
| 2019/0042229 | A1* | 2/2019 | Kotary | G06F 8/65 |
| 2022/0113960 | A1* | 4/2022 | Moran | G06F 8/658 |

* cited by examiner

Primary Examiner — Eric T Oberly
(74) Attorney, Agent, or Firm — Larson Newman, LLP (57) ABSTRACT An information handling system may determine an allocated space in an option read-only memory (ROM), and store a firmware module in the allocated space in the option ROM. The system may load basic input/output system firmware from a serial peripheral interface flash memory with the firmware module from the allocated space in the option ROM.

20 Claims, 8 Drawing Sheets

OPTION READ-ONLY MEMORY FIRMWARE-BASED REMEDIATION

FIELD OF THE DISCLOSURE

The present disclosure generally relates to information handling systems, and more particularly relates to option read-only memory firmware-based remediation.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may determine an allocated space in an option read-only memory (ROM), and store a firmware module in the allocated space in the option ROM. The system may load basic input/output system firmware from a serial peripheral interface flash memory with the firmware module from the allocated space in the option ROM.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
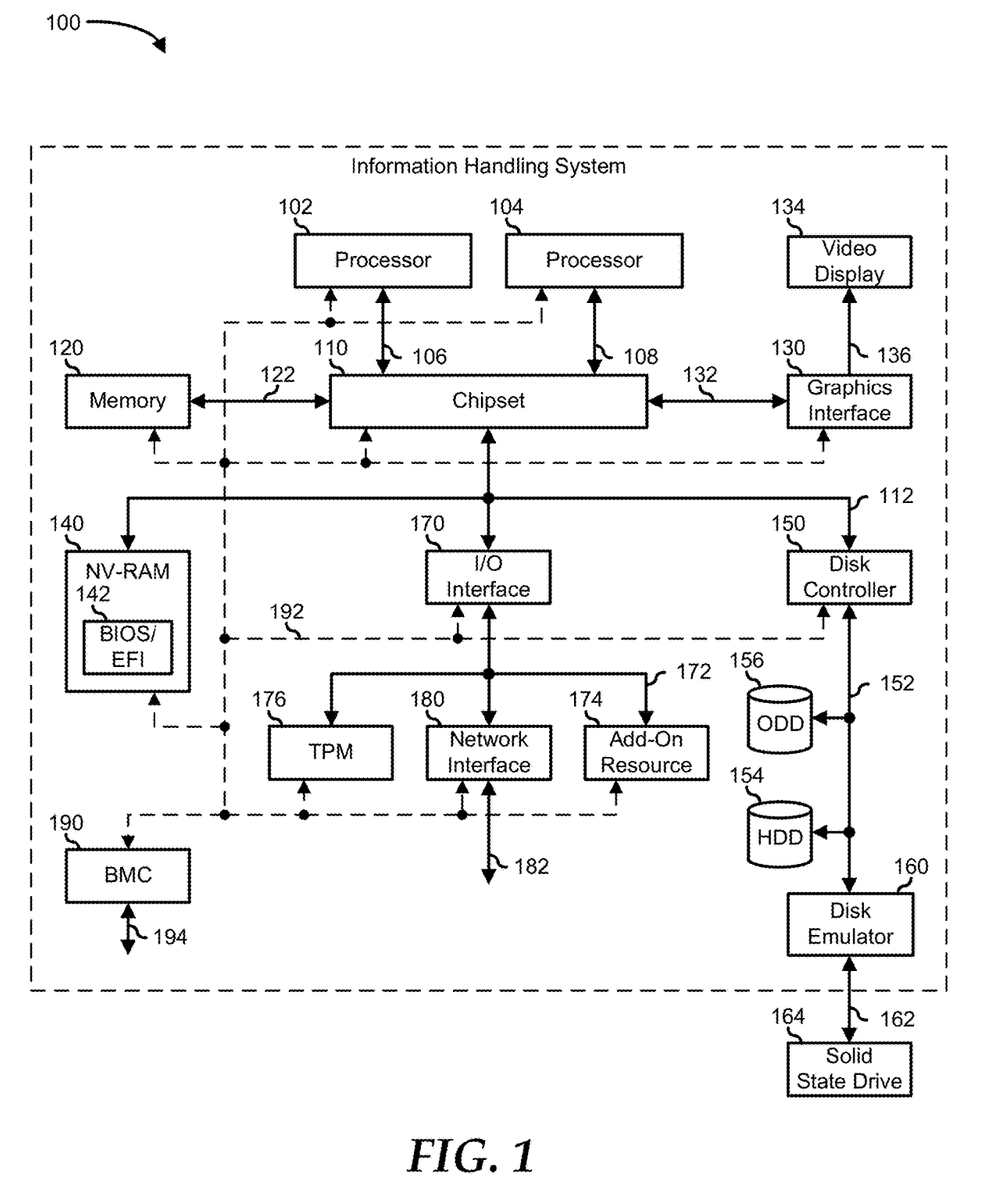
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/ video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular-based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs (OpROMs) for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

During the lifetime of an information handling system, it may become necessary or advisable to update the firmware at the SPI flash memory. For example, a bug might be found in third-party firmware that causes the boot process to fail. In another example, the third-party vendor may want to provide additional features. To update a firmware in the SPI flash, a procedure often referred to as flashing the BIOS typically is performed. During this process, the previous BIOS can be deleted, and the revised BIOS can be stored on the flash memory device. However, flashing the BIOS carries some risks. For example, the computer could become "bricked" and unable to boot.

Also, because the storage capacity of the SPI flash memory device typically is limited to 32 megabytes (MB) or 64 MB of data, the size of firmware revisions typically is restricted. In addition, currently there is no method to update a portion of the firmware instead to fix a bug or add a feature instead of flashing the entire BIOS. For example if a minor change is needed in the BIOS to fix a security issue or a corrupted area of the BIOS firmware, the entire BIOS firmware is updated.

An OpROM is an autonomous piece of firmware that resides in a ROM on an expansion card or is stored with the main system BIOS. The OpROMs in an expansion card typically are created and/or controlled by third-party vendors while the OpROMs in the motherboard, also referred to as BIOS contained OpROMs, are created and/or controlled by the manufacturer of the information handling system. An example of an OpROM controlled by the manufacturer may be a video BIOS OpROM, which typically is loaded early in the boot process to coordinate operations of the video subsystem with the main BIOS and operating system so that information can be presented on the display. OpROMs typically have two kilobytes of storage capacity. In some instances, this storage capacity is not efficiently used, and some OpROMs have unused storage space or free spaces. The present disclosure includes a system and method to leverage these free spaces of BIOS contained OpROMs, referred herein simply as OpROMs, on the motherboard for storage of a firmware module to address the limited storage capacity of the SPI flash memory. By leveraging the storage capacity of one or more OpROMs, the present disclosure can update the firmware module without flashing the BIOS.

Figure 2:
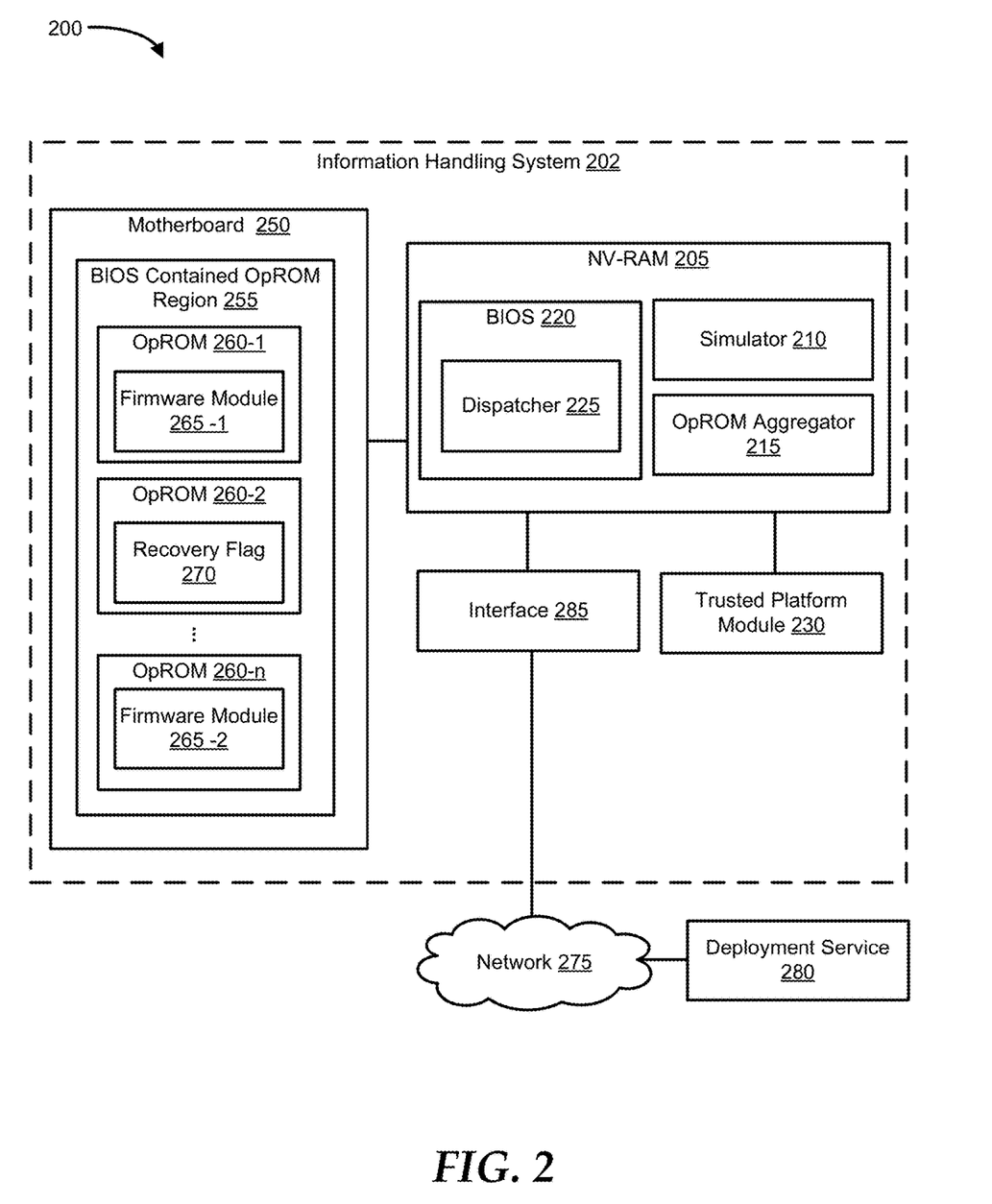
FIG. 2 is a block diagram illustrating an information handling system for option read-only memory (OpROM) firmware-based remediation, according to an embodiment of the present disclosure.

FIG. 2 illustrates a system 200 for OpROM firmware-based remediation. System 200 includes an information handling system 202, a network 275, and a deployment service 280. Information handling system 202, which is similar to information handling system 100 of FIG. 1, includes an NV-RAM 205, a motherboard 250, an interface 285, and a trusted platform module 230. NV-RAM 205 includes a simulator 210, an OpROM aggregator 215, and a BIOS 220 that includes a dispatcher 225. Motherboard 250 includes a BIOS contained OpROM region 255 that includes OpROMs 260-1, 260-2 through 260-n. OpROM 260-1 includes a firmware module 265-1. OpROM 260-2 includes a recovery flag 270. OpROM 260-n includes a firmware module 265-2. Firmware module 265-1 and firmware module 265-2 are portions of a firmware module. A firmware module may be firmware for a third-party vendor or a unified extensible firmware interface (UEFI) driver. In this example, the firmware module may be used to replace an older version of the firmware module to remediate or fix a bug or add a new feature.

BIOS contained OpROM region 255 may be used to store configuration data in one or more OpROMs while the information handling system is in the manufacturing mode. The configuration data may include one or more recovery flags, UEFI variables, secured vendor keys, and/or certificates. The secured vendor keys and/or certificates may be used when validating a firmware module. The recovery flags may be associated with the manufacturer of the information handling system and used during recovery, failover, and/or update of a firmware driver or module.

BIOS 220, which is similar to BIOS/EFI 142 of FIG. 1, may be configured to perform a power-on self-test (POST) at power-on or reboot of information handling system 202. The POST may include execution of one or more of OpROMs 260-1 through 260-2 by BIOS 220, or in particular, dispatcher 225. Dispatcher 225 may be a pre-EFI initialization (PEI) dispatcher and/or a driver execution environment (DXE) dispatcher. The execution of the OpROMs may be part of a simulation by simulator 210 during the execution of the BIOS firmware from SPI flash memory along with a firmware module stored in at least one of the OpROMs 260-1 through 260-n instead of the older version of the firmware module in NV-RAM 205 or SPI flash memory.

In addition, BIOS 220 may be configured to locate configuration data in one or more OpROMs during POST instead of their typical location in NV-RAM 205. The configuration data may include a recovery flag, variable, third-party vendor key, and/or certificate. Accordingly, the boot path, such as a failover boot path or updated firmware boot path, may have been updated with a pointer to the firmware module and the configuration data stored at the OpROMs. This allows the firmware module and the configuration data to be loaded during the boot process or at runtime. The firmware module and the recovery data can also be loaded during the recovery, failover process, or system management mode.

Deployment service 280 may be a network software deployment service that can be used to deliver updates to computing devices such as Microsoft® System Center Configuration Manager or Dell® SupportAssist services. Interface 285 may be configured to provide network-based firmware update or recovery by downloading the firmware module from deployment service 280 via network 275 to the OpROMs which are then loaded as part of the corrective action. This enables remediation of firmware modules without flashing the entire NV-RAM 205. This also allows the ability to replace the BIOS without the need to ship the motherboard back to the manufacturer for replacement. Network 275 may be a public network, such as the Internet, a physical private network, a wireless network, a virtual private network, or any combination thereof.

OpROM aggregator 215 may include an OpROM aggregator PEI module (PEIM)-to-PEIM interface (PPI) and an OpROM aggregator protocol. OpROM aggregator 215 may include functions or services that can be utilized by other modules. For example, OpROM aggregator 215 may include a service to enumerate the OpROMs, get a BIOS contained OpROM region address, get an OpROM instance, write a firmware module to the BIOS contained OpROM region, and validate the vendor or UEFI firmware. As used herein, a firmware module includes a third party or UEFI driver. In addition, OpROM aggregator 215 may be configured to rebuild the firmware module by aggregating portions thereof that may have been stored at different OpROMs, during the boot process. In this example, firmware module 265-1 and firmware module 265-2 are portions of a firmware module.

Because the OpROMs 260-1 and 260-n are in the boot path, the firmware module may be rebuilt and loaded to apply the fix without a reboot. Thus, information handling system 202 may continue with the boot process without interruption or downtime. OpROM aggregator 215 may be loaded during the PEI phase and/or the DXE phase when the platform code detects when OpROM-based dispatching is enabled, and the boot mode is set to OpROM-based dispatch mode. The location of the OpROM aggregator may be determined by the DXE drivers and OpROM update modules. In addition, because of its location on motherboard 250, OpROMs 260-1 through 260-n are typically hidden, write-protected, trusted, and read-only. This means that data such as the firmware module and the configuration data stored therein may be protected from being written into by an unauthorized module, firmware, or driver.

TPM 230, which is similar to TPM 176 of FIG. 1, may be configured to implement a root of trust that includes the firmware module stored in the OpROM 260-1 through 206-n. For example, a globally unique identifier (GUID) of the firmware volume where the OpROMs are located may be added to the security evaluation path for platform configuration register (PCR) of TPM 230 measurement before being loaded.

Figure 3:
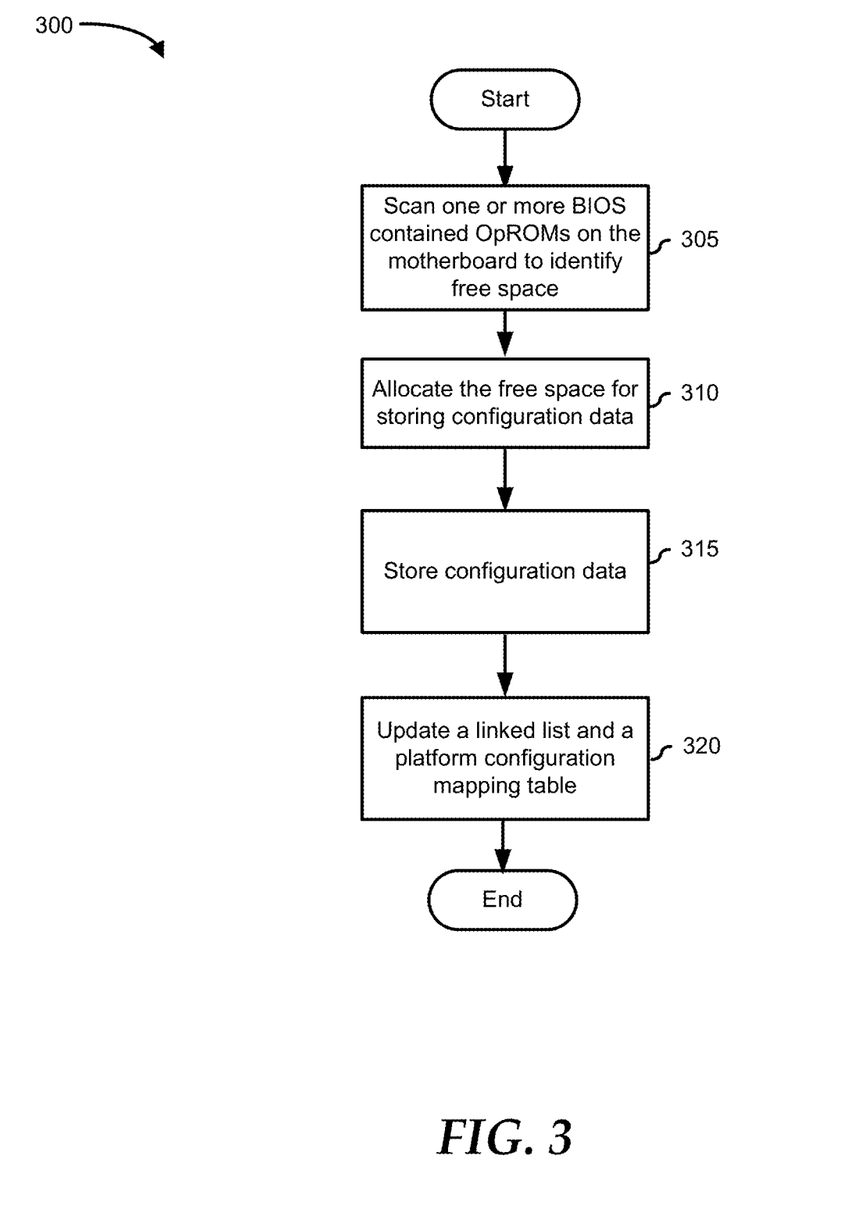
FIG. 3 is a flowchart illustrating a method for OpROM firmware-based remediation, according to an embodiment of the present disclosure.

FIG. 3 shows a flowchart of a method 300 to allocate free space in one or more OpROMs and store configuration data. Method 300 may be performed during the manufacturing mode of the information handling system at the factory before shipping. For example, method 300 may be performed during a new platform initialization phase. Method 300 typically starts at block 305, where the method may scan or parse the OpROMs on the motherboard to determine whether there are free spaces in each of the OpROMs.

At block 310, the free spaces may be carved out or allocated to store configuration data and one or more firmware modules. For example, the method may get the I/O handles of the PCI devices installed on the motherboard. Afterwards, the method may check the PCI handle configuration space to determine whether it contains an OpROM. If it is determined that there is an OpROM in the PCI device, the method may get the address of the free space. The method may calculate the unused or free space in the OpROM and allocate that space as an advanced configuration and power interface (ACPI) non-volatile sleeping memory region.

At block 315, the method may use some of the allocated space to store configuration data, such as one or more UEFI variables, recovery flags, vendor keys, and certificates. For example, a recovery flag may be set to enable OpROM-based firmware dispatch. At block 320, method 300 may update a linked list, a register, and a platform configuration mapping table with information regarding the free space in each of the OpROMs. The linked list may be a linked list of OpROM headers with a pointer to the BIOS contained OpROM region, such as an address, memory offset, size, etc. The platform configuration mapping table may include information regarding the location of the configuration data.

Figure 4:
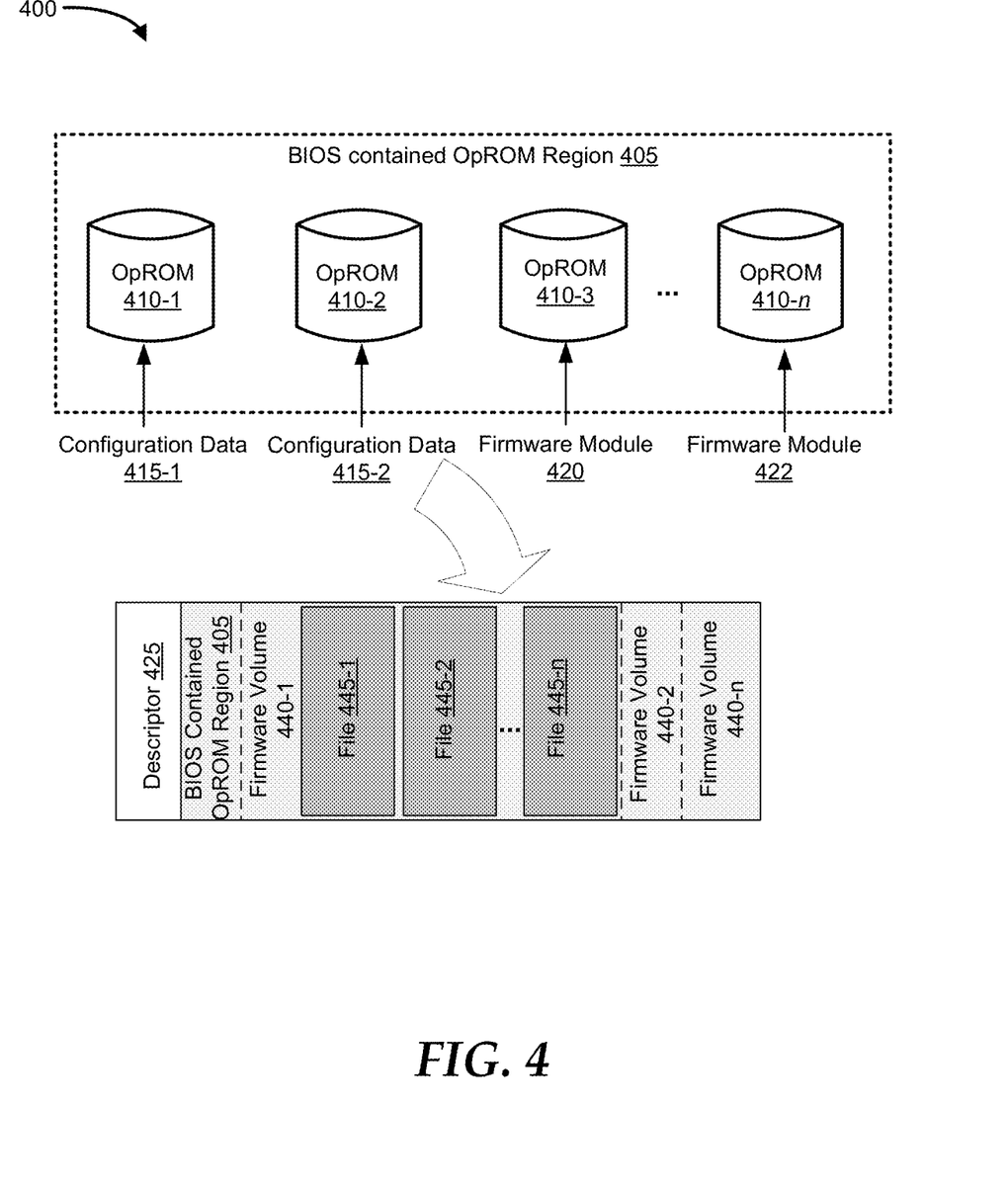
FIG. 4 is a diagram illustrating a memory for OpROM firmware-based remediation, according to an embodiment of the present disclosure.

FIG. 4 shows a block diagram of a ROM 400 configured for OpROM-based firmware remediation. ROM 400 may be partitioned into several regions which include a descriptor 425, and a BIOS contained OpROM region 405. The BIOS contained OpROM region may store a firmware module to be used by a particular device or process in an information handling system. Descriptor 425 describes which process or processes may access a particular region, such that all other processes not described for that region are restricted from access.

BIOS contained OpROM region 405 includes a firmware volume 440-1, firmware volume 440-2 through firmware volume 440-n, also referred to herein as firmware volumes 440. Each firmware volume may also be organized in a firmware file system. For example, firmware volume 440-2 includes a file 445-1, and file 445-2 through file 445-n. In this example, BIOS contained OpROM region 405 includes OpROMs 410-1 through 410-n. An OpROM may be stored in one file. For example, OpROM 410-1 may be in file 445-1, OpROM 410-2 in file 445-2, and so on. These are just examples and may not be used to limit the present disclosure. For example, OpROM 410-1 may be in a file in a firmware volume 4402 while OpROM 410-2 may be in a file in firmware volume 440-n.

An OpROM includes a firmware or driver that the BIOS executes. In addition, the OpROM may be configured at the factory to store configuration data. In this example, each OpROM includes configuration data stored in the free space determined at block 305 of FIG. 3. For example, configuration data 415-1 is stored in OpROM 410-1 and configuration data 415-2 is stored in OpROM 410-2. Also, firmware module 420 is stored in OpROM 410-3 and firmware module 422 is stored in OpROM 410-n. In another embodiment, firmware module 422 may be stored in more than one OpROM. This information may be found in the platform configuration map, which is used to maintain a mapping of the configuration data to a particular OpROM. For example, the platform configuration mapping table may show that configuration data 415-1 is stored in OpROM 410-1. Accordingly, the linked list indicates the location of OpROM 410-1.

The information stored in the linked list and the mapping table may be used by the DXE dispatcher to detect and dispatch the firmware update. The configuration data stored in different OpROMs may be aggregated during the firmware update. For example, configuration data 415-1 may be a vendor key, and configuration data 415-2 may be a vendor certificate which may be aggregated during the validation of a firmware module.

Because the OpROMs in BIOS contained OpROM region 405 are hidden, trusted, and read-only, the configuration data and firmware module stored therein may be write-protected from an unauthorized module, firmware, or driver preventing the BIOS, vendor, or UEFI firmware to be corrupted or altered. Also, the configuration data may be stored as bootable firmware which can be loaded during recovery or failover, such as during system management mode, the boot process, or at runtime.

Figure 5:
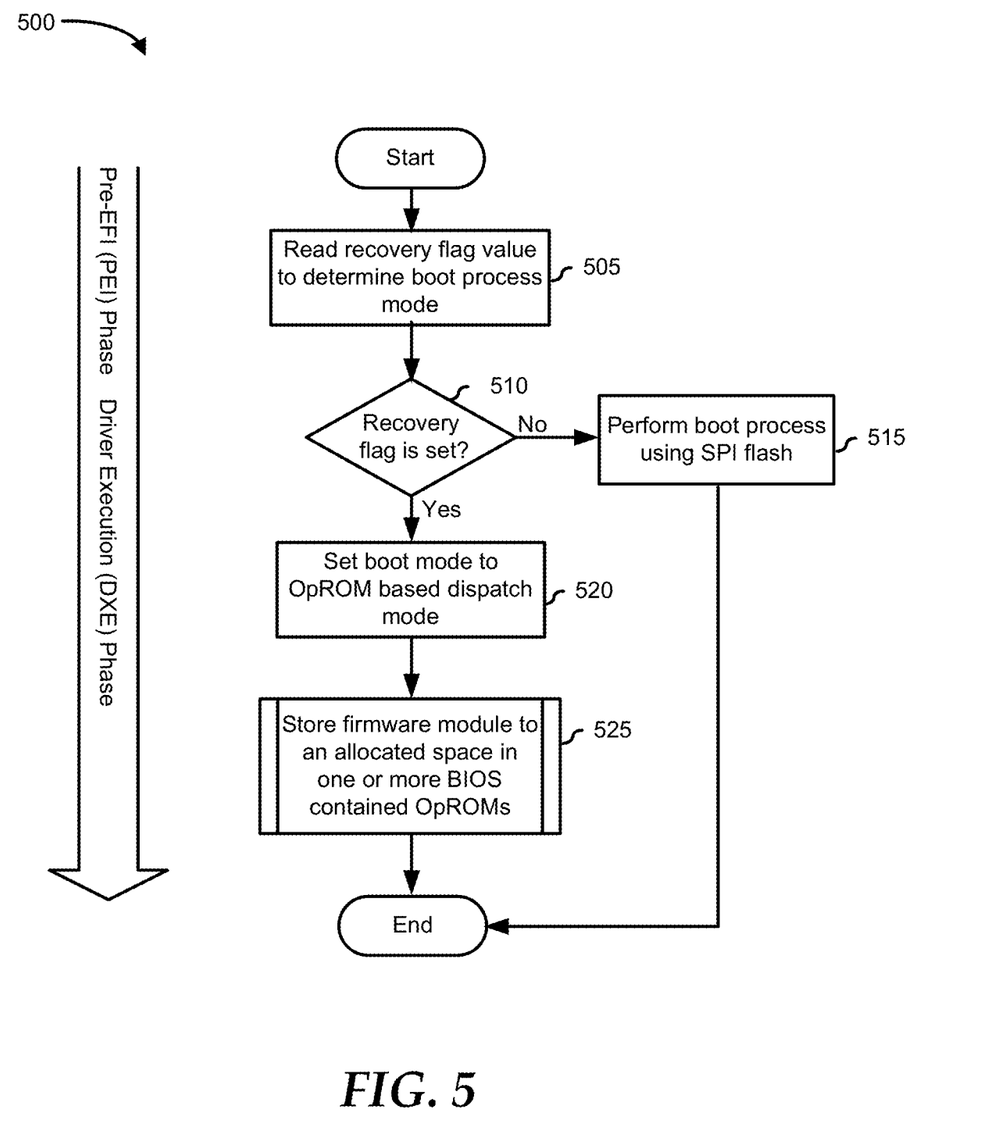
FIG. 5 is a flowchart illustrating a method for OpROM firmware-based remediation, according to an embodiment of the present disclosure.

FIG. 5 shows a flowchart of a method 500 to store a firmware module or portions thereof in an allocated space in one or more OpROMs for OpROM-based firmware remediation. Method 500 typically starts at block 505, wherein during the PEI phase, the method may read a recovery flag to determine whether an OpROM-based firmware update is enabled. The value of the recovery flag may be set to one or true if an OpROM-based firmware driver update is enabled. Conversely, the value of the recovery flag may be set to zero or false if the OpROM-based firmware remediation is disabled. The method proceeds to decision block 510, where the method determines whether the recovery flag is set. If the recovery flag is set, then the method takes the "YES" branch and proceeds to block 520. If the recovery flag is not set, then the method takes the "NO" branch and proceeds to block 515.

At block 515, the method, such as by the DXE dispatcher may continue the boot process using the SPI flash. At block 520, the method may enable OpROM-based firmware dispatch mode by setting an OpROM dispatch flag to true or one. This allows the firmware module to be stored in an allocated space in one or more OpROMs.

At block 525, the method, such as the DXE dispatcher may store the firmware module in one or more OpROMs in the BIOS contained OpROM region. The firmware module may be stored as bootable firmware and be loaded in the failover, recovery, and firmware update boot path. A more detailed illustration of block 525 is shown in FIG. 6.

Figure 6:
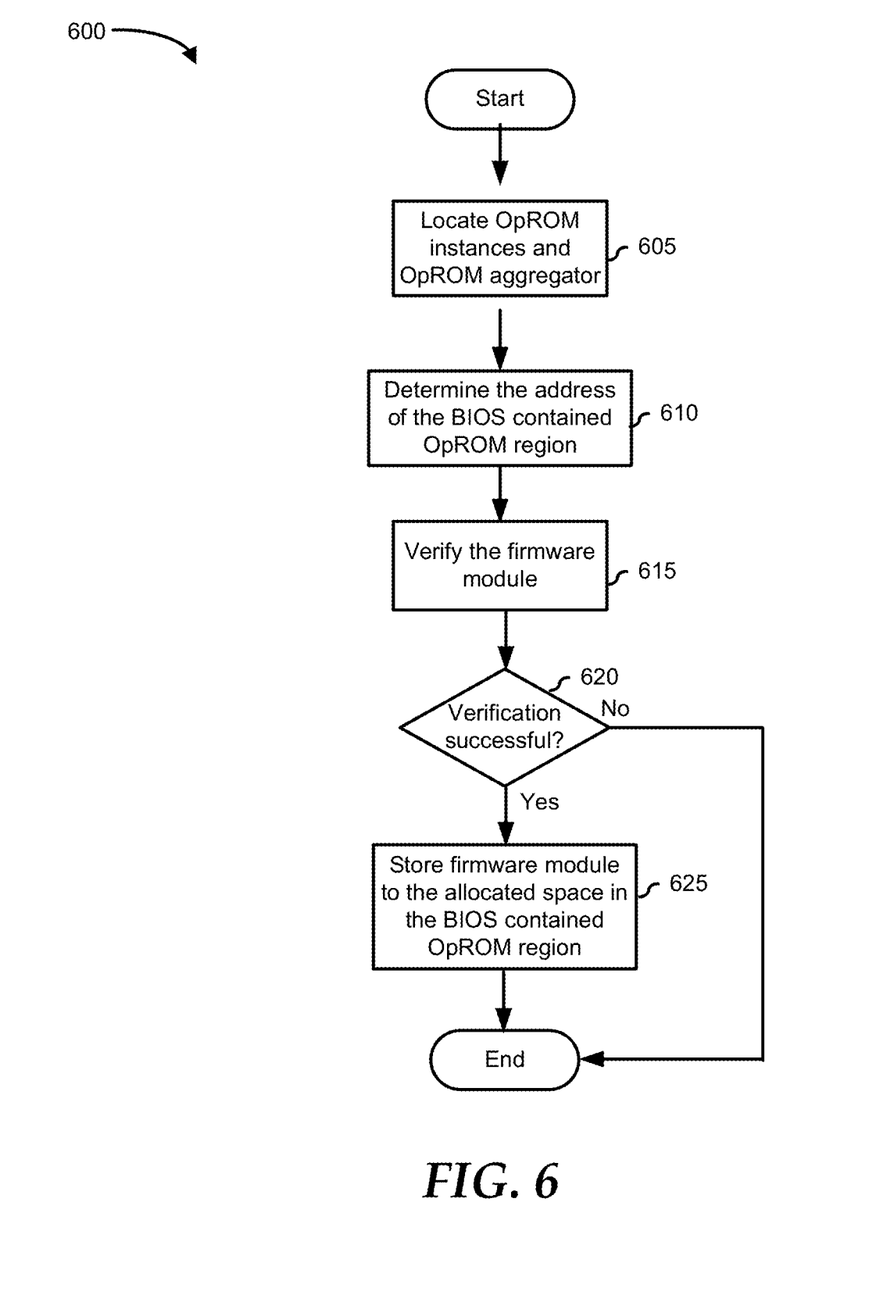
FIG. 6 is a flowchart illustrating a method for OpROM firmware-based remediation, according to an embodiment of the present disclosure.

FIG. 6 shows a flowchart of a method 600 to store a firmware module or portions thereof in an allocated space in one or more OpROMs for OpROM-based firmware remediation mode. The flowchart is a more detailed illustration of block 525 of FIG. 5.

Method 600 typically starts at block 605 where the method locates the BIOS contained OpROM instances and the BIOS contained OpROM aggregator protocol, which may be used to locate the OpROMs and the memory chunks list. The memory chunks list may be used to determine the carved out or allocated spaces in the OpROMs where the instructions, firmware module, and/or configuration data are stored.

At block 610, the method determines the address of the allocated spaces in the OpROMs. For example, the method may determine the offsets associated with the allocated spaces in the BIOS contained OpROM region. At block 615, the method may verify the firmware module, such as by code measurement, cryptographic hash functions, and the like. The verification may utilize a key and/or certificate of the third-party vendor associated with the firmware volume.

At decision block 620, the method may determine whether the verification is successful. If the verification is successful, then the "YES" branch is taken, and the method proceeds to block 625 where the firmware module is stored in the allocated space according to the determined address at block 625. If the firmware module fails verification, then the "NO" branch is taken, and the method ends. After storing the firmware module in the allocated space, a pointer to the firmware module may be updated in the dynamic linked list associated with the BIOS contained OpROM region. This allows the boot path to be updated with the location of the firmware module. A pointer to the older firmware module may also be removed from the boot path.

Figure 7:
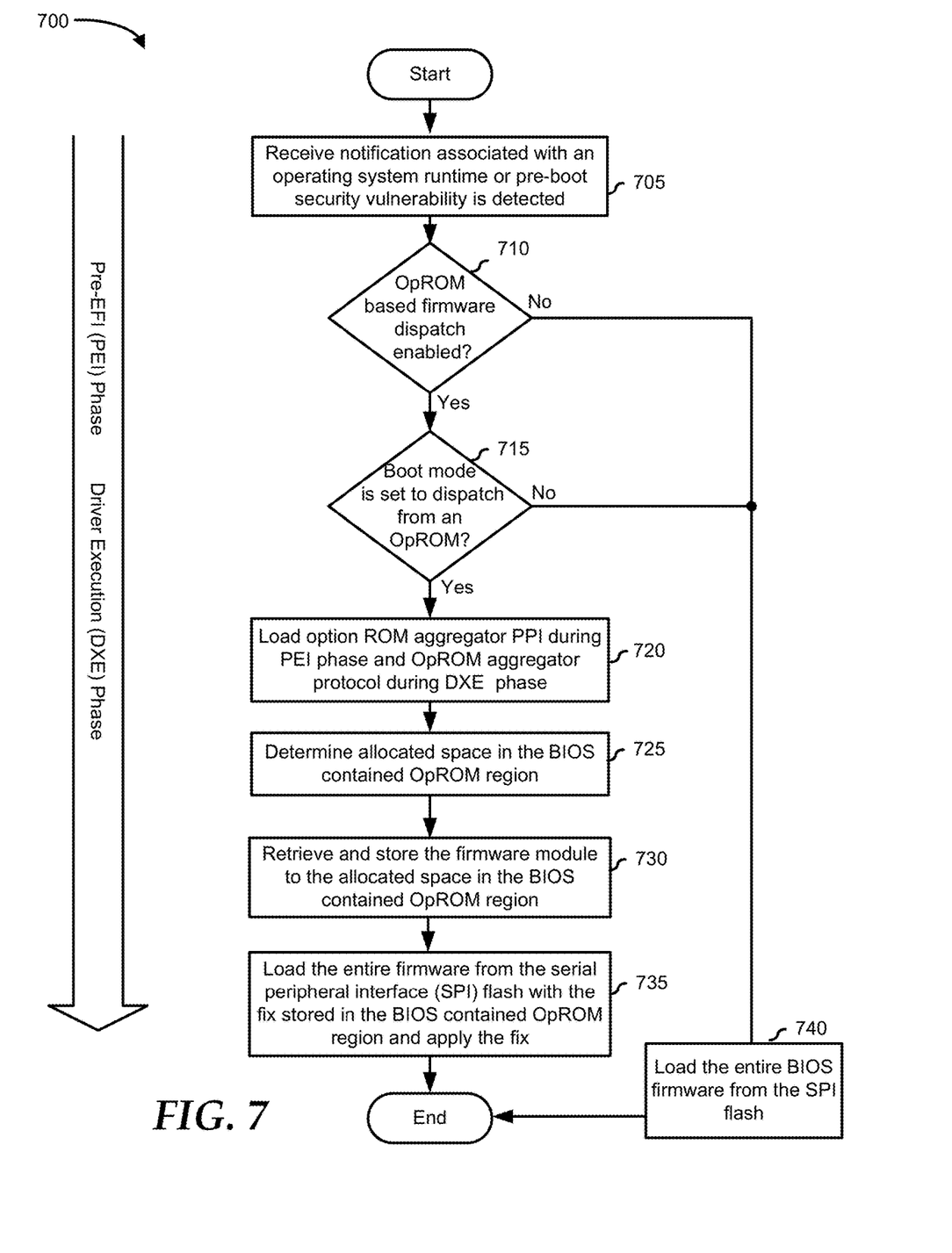
FIG. 7 is a flowchart illustrating a method for OpROM firmware-based remediation, according to an embodiment of the present disclosure.

FIG. 7 shows a flowchart of a method 700 for OpROM firmware-based remediation. Method 700 typically starts at block 705 where a notification associated with an operating system runtime or pre-boot security vulnerability is detected. The method may parse the notification to determine information associated with a fix for the detected operating system runtime or pre-boot security vulnerability. The information may include a location for the fix. The fix may be a firmware module with a bug fix and/or a new feature.

At decision block 710, the method determines whether an OpROM-based firmware dispatch is enabled. This is the recovery flag that may have been configured at the factory when the information handling system was configured for OpROM firmware-based remediation, such as by method 300 of FIG. 3. If the OpROM-based firmware dispatch is enabled, then the "YES" branch is taken, and the method proceeds to decision block 715. If the OpROM-based firmware dispatch is not enabled, then the method proceeds to block 745.

At decision block 715, the method determines whether the boot mode is set to dispatch from an OpROM. If the boot mode is set to dispatch from an OpROM, then the "YES" branch is taken, and the method proceeds to block 720. If the boot mode is not set to dispatch from an OpROM, then the "NO" branch is taken, and the method proceeds to block 745.

At block 720, the method may load an OpROM aggregator PPI and/or an OpROM aggregator protocol during the PEI phase or DXE phase. The OpROM aggregator PPI may be published during the PEI phase and the OpROM aggregator protocol published during the DXE phase. Both aggregators may be consumed by another method. The OpROM aggregator PPI and OpROM aggregator protocol include functions or services to get and configure OpROM devices with vendor or UEFI firmware. For example, the services may include a service to enumerate OpROMs, get the BIOS contained OpROM region address, get the OpROM instance, write the vendor or UEFI firmware to the BIOS contained OpROM region, and validate the vendor or UEFI firmware. In particular, the method 300 may install the OpROM aggregator protocol during the DXE phase when the platform code detects OpROM-based vendor or UEFI firmware dispatching is enabled, and the boot mode is set to boot from the BIOS code contained in the OpROMs.

At block 725, the method may determine the allocated space in the BIOS contained OpROM region. In particular, the method may determine the start address, offset, and/or size of the allocated space in the BIOS contained OpROM region. The method may query a dynamic linked list to determine the location of the allocated space. At block 730, the method may retrieve the firmware module from the download service and store it in the allocated space of the BIOS contained OpROM region. The firmware module may be stored in one or more OpROMs. The method may parse the firmware module or image thereof to get the signature and size and evaluate the signature before storage.

A globally unique identifier of the fixed firmware module may be added to the security evaluation path for TPM PCR measurement and may be loaded to run with the fixed firmware module. The firmware volume GUID used in the TPM PCR measurement may be extended by using a dynamic map with a set of GUID of the fixed firmware modules. The platform variable store may be updated regarding the extended firmware volume GUID and the availability of the fixed firmware module so that this information may be used during the TPM PCR measurement on reboot. For the fixed firmware module that is not part of the boot path, a dynamic loader may be used to load the firmware module. The dynamic loader may also use a dependency link and memory map for managing the dependencies of the firmware module. The memory map provides the location of the fixed firmware module or portion thereof in addition to the location of its dependencies.

At block 735, the method may load the entire firmware in the SPI flash memory along with the firmware module in the allocated space of the BIOS contained OpROM region. If portions of the fix have been stored in different OpROMs in the BIOS contained OpROM region, then the method may aggregate the portions before loading the fix. Loading the entire firmware and fix may be performed by a simulator to test the boot path and ensure that the information handling system does not become "bricked" or encounter a fatal error. The simulator may also provide its success rate for applying the fix. A reboot may or may not be required based on the type of PCI device associated with the firmware module. At block 740, the method loads the entire BIOS firmware from the SPI flash. The method may also flash the BIOS.

Figure 8:
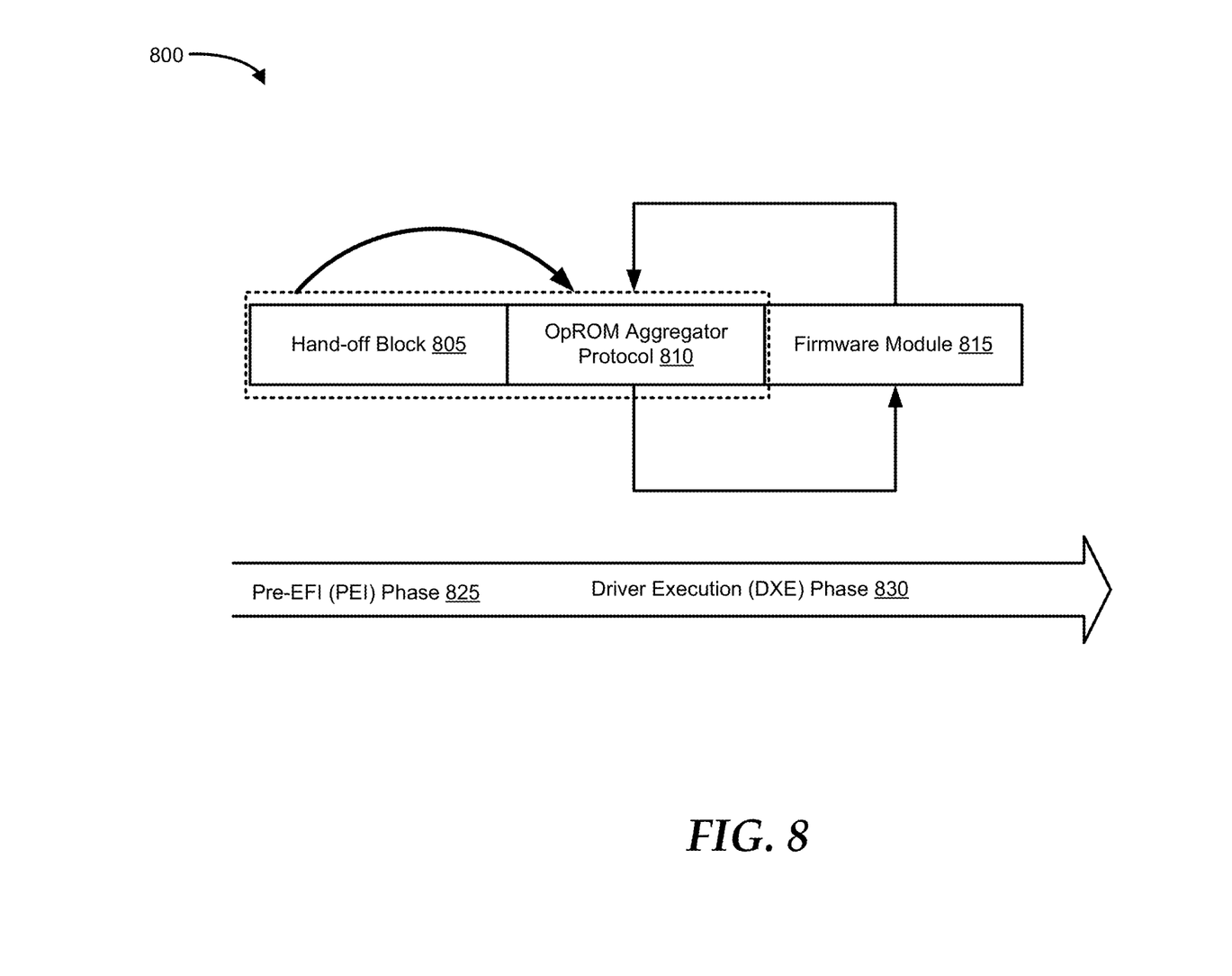
FIG. 8 is a block diagram of a boot process for OpROM firmware-based remediation, according to an embodiment of the present disclosure.

FIG. 8 shows a diagram of boot process 800 for OpROM firmware-based remediation. Boot process 800 includes a PEI phase 825 and a DXE phase 830. Boot process 800 may include additional phases not shown for simplicity. During PEI phase 825, the OpROM aggregator PPI may describe the location of the BIOS contained OpROM region and/or firmware module 815 in hand-off block 805. Hand-off block 805 may also include information regarding the configuration data, such as its location. The OpROM aggregator PPI may then pass hand-off block 805 to OpROM aggregator protocol 810 during DXE phase 830. OpROM aggregator protocol 810 may include functions or services that may retrieve information associated with firmware module 815. In addition, one or more parameters in OpROM aggregator protocol 810 with the retrieved information can be consumed by DXE drivers. The information may be used by the DXE drives to load and dispatch the firmware module. The firmware module may be loaded and dispatched by DXE drivers in response to a detecting an event, such as a firmware recovery, failover, and/or firmware update.

Although FIG. 3, FIG. 5, FIG. 6, and FIG. 7 show example blocks of method 300, method 500, method 600, and method 700 in some implementations, method 300, method 500, method 600, and method 700 may include additional blocks, fewer blocks, different blocks, or differently arranged blocks than those depicted in FIG. 3, FIG. 5, FIG. 6, and FIG. 7. Those skilled in the art will understand that the principles presented herein may be implemented in any suitably arranged processing system. Additionally, or alternatively, two or more of the blocks of method 300, method 500, method 600, and method 700 may be performed in parallel. For example, block 315 and block 320 of method 300 may be performed in parallel. Further, one of skill in the art will appreciate that these flowcharts explain typical examples, which can be extended to advanced applications or services in practice.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that causes a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   in response to detecting during a boot process, by a processor, a bug, determining whether an option read-only memory (ROM) based firmware dispatch is enabled;
   if the option ROM based firmware dispatch is enabled, then determining an allocated space in the option ROM;
   storing a first portion of a firmware module in the allocated space in the option ROM and storing a second portion of the firmware module in another allocated space of another option ROM, wherein the firmware module includes a fix for the bug; and
   aggregating the first portion in the option ROM and the second portion in the another option ROM resulting in an aggregated firmware module; and
   loading, during a driver execution phase of the boot process, a basic input/output system firmware from a serial peripheral interface flash memory with the aggregated firmware module.

2. The method of claim 1, further comprising allocating free space in the option ROM creating the allocated space.

3. The method of claim 2, wherein the allocating of the free space is performed during a manufacturing mode.

4. The method of claim 1, further comprising storing a recovery flag in the allocated space.

5. The method of claim 1, wherein the option ROM is located on a motherboard.

6. The method of claim 1, further comprising aggregating a first portion of a second firmware module in a second option ROM and a second portion of the second firmware module in a third option ROM resulting in an aggregated second firmware module prior to loading the second firmware module.

7. The method of claim 1, wherein the firmware module is configured to remediate a detected issue.

8. An information handling system, comprising:
   a processor; and
   a memory device storing instructions that when executed cause the processor to perform operations including:
      in response to detecting during a boot process an operating system runtime vulnerability, determining whether an option read-only memory (ROM) based firmware dispatch is enabled;
      if the option ROM based firmware dispatch is enabled, then determining an allocated space in the option ROM;
      storing a first portion of a firmware module in the allocated space of the option ROM and storing a second portion of the firmware module in another allocated space of another option ROM, wherein the firmware module includes a fix for the operating system runtime vulnerability;
      aggregating the first portion of firmware module in the allocated space of the option ROM and the second portion in another allocated fix of the another option ROM resulting in an aggregated firmware module; and
      loading, during a driver execution phase of the boot process, a basic input/output system firmware from a serial peripheral interface flash memory with the aggregated firmware module.

9. The information handling system of claim 8, wherein the operations further comprising allocating free space in the option ROM creating the allocated space.

10. The information handling system of claim 9, wherein the allocating of the free space is performed during a manufacturing mode.

11. The information handling system of claim 8, further comprising storing a recovery flag in the allocated space.

12. The information handling system of claim 8, wherein the option ROM is located on a motherboard.

13. The information handling system of claim 8, further comprising aggregating a first portion of a second firmware module in a second option ROM and a second portion of the second firmware module in a third option ROM resulting in an aggregated second firmware module prior to loading the second firmware module.

14. The information handling system of claim 8, wherein the firmware module is configured to remediate a detected issue.

15. A non-transitory computer-readable media to store instructions that are executable to perform operations comprising:
   in response to detecting during a boot process, by a processor, a vulnerability, determining whether an option read-only memory (ROM) based firmware dispatch is enabled;
   if the option ROM based firmware dispatch is enabled, then determining an allocated space in the option ROM;
   storing a first portion of a firmware module in the allocated space of the option ROM and storing a second portion of the firmware module in another option ROM, wherein the firmware module includes a fix for the vulnerability;
   aggregating the first portion of the firmware module in the allocated space of the option ROM and the second portion of the firmware module in the another option ROM resulting in an aggregated firmware module; and
   loading, during a driver execution phase of the boot process, a basic input/output system firmware from a serial peripheral interface flash memory with the aggregated firmware module.

16. The non-transitory computer-readable media of claim 15, further comprising allocating free space in the option ROM creating the allocated space.

17. The non-transitory computer-readable media of claim 16, wherein the allocating of the free space is performed during a manufacturing mode.

18. The non-transitory computer-readable media of claim 15, further comprising storing a recovery flag in the allocated space.

19. The non-transitory computer-readable media of claim 15, wherein the option ROM is located on a motherboard.

20. The non-transitory computer-readable media of claim 15, further comprising aggregating a first portion of a second firmware module in a second option ROM and a second portion of the second firmware module in a third option ROM resulting in an aggregated second firmware module prior to loading the second firmware module.

* * * * *